April 2, 1929.  J. BERGE  1,707,247
GEARED SPEED CHANGING DEVICE
Filed July 2, 1925
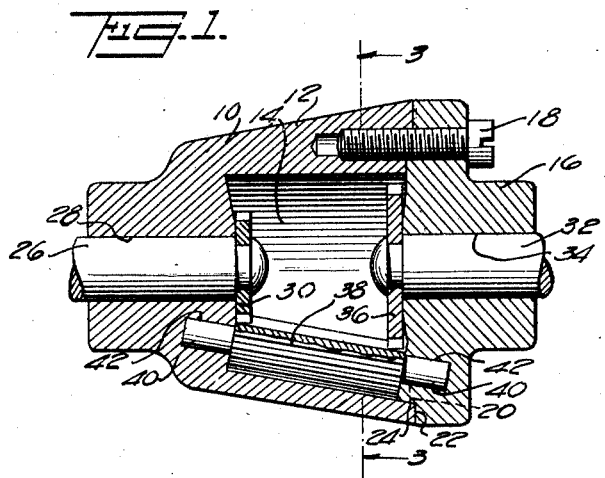
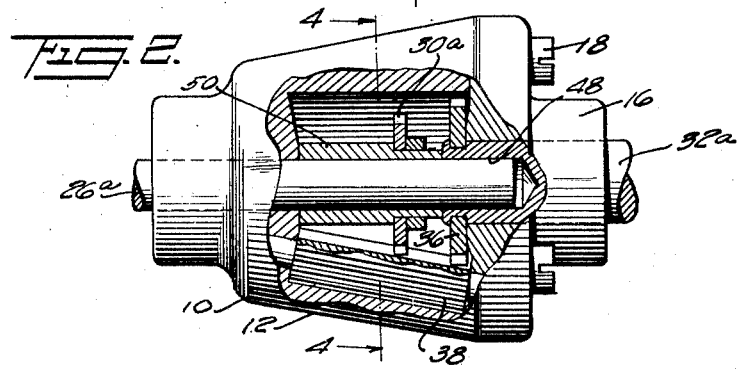
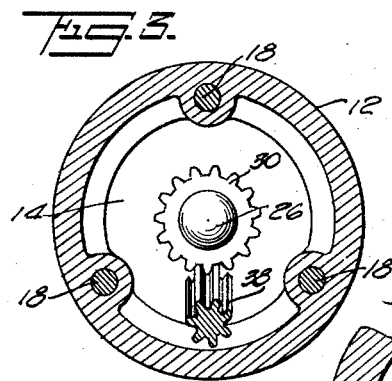
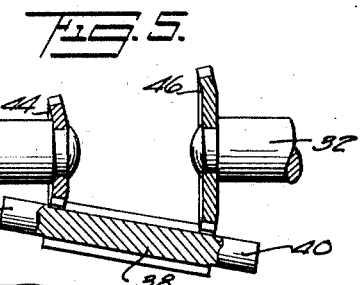
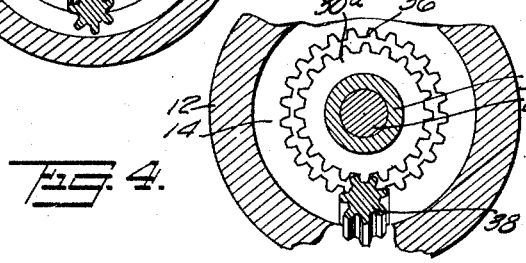
INVENTOR
Joseph Berge
BY
ATTORNEY Patented Apr. 2, 1929.

1,707,247

UNITED STATES PATENT OFFICE.

JOSEPH BERGE, OF MONTCLAIR, NEW JERSEY.

GEARED SPEED-CHANGING DEVICE.

Application filed July 2, 1925. Serial No. 41,223.

My invention relates to a geared speed changing device adapted to increase or decrease the speed of a shaft without change in the direction of rotation and preferably without changing the axis of rotation.

My invention provides a simple, compact, and inexpensive device having a wide field of application, particularly in light machinery. For one example, speed changing devices embodying my invention may be applied to operation counters, shafts for taximeters, and the like, to compensate for change such as difference in tariff rates of different cities, changes in units of measure, as from miles to kilometers etc., and there are a large number of other cases, of which the specific instances given are merely suggestive. The moving parts are preferably compactly housed in a casing, which may contain a lubricant and the device does not require attention over a long period of time.

In the drawings, Fig. 1 is a central, sectional view of a geared speed changing device in accordance with my invention.

Fig. 2 is a side view of a modified form with parts broken away to show the interior construction.

Fig. 3 is a section on line 3—3, Fig. 1.

Fig. 4 is a section on line 4—4 Fig. 2, and

Fig. 5 is a part sectional, part diagrammatic view of apparatus embodying the invention making use of a modified form of pinion in which the tooth profile plane is perpendicular to the axis of the idler pinion.

The geared speed changing device of Fig. 1 is of a highly simplified form, and as shown is enclosed in the casing 10. Said casing 10 comprises the member 12 containing the chamber 14, and closed by the casing member 16, which may be secured to casing member 12, as by screws 18. Member 16 may advantageously comprise a taper reduced portion 20 terminating in a shoulder 22 and received within the taper annular lip or flange 24 of casing member 12, thereby obtaining an accurate fit and registration of the casing parts.

Shaft 26 has its bearing in the bore 28 of casing member 12, and has the gear 30 secured to the end of said shaft 26 which projects into chamber 14. The other casing member 16 has a shaft 32 extending therethrough and journaled in the bore 34 formed therein preferably in axial alignment with the bore 28 in member 12. Said shaft 32 has the gear 36 fixed to the end of said shaft 32 which projects within the chamber 14. The teeth of gears 30 and 36 are alike in shape and in tooth pitch but the number of teeth on the two gears is different, according to the speed change desired to be obtained.

Gears 30 and 36 respectively mesh with the teeth of idler pinion 38, which are like the teeth of gears 30 and 36 in form and circular pitch. Said pinion 38 is arranged with its axis at an angle to the common axis of shafts 26 and 32 depending on the distances apart and the differences in diameters of pinions 30 and 36 which are fixed on shafts 26 and 32 respectively. The idler pinion 38 is provided with trunnions 40, 40 received in the bearing bores 42, 42 provided in the casing members 12 and 16 respectively.

While for many purposes it will be sufficient to make the gears 30 and 36 in the flat from sheets or otherwise, it may be of advantage in certain cases, as where the device is to be subjected to increased strain and wear, to dish these gears as indicated at 44, 46, Fig. 5, thereby bringing the tooth profile plane perpendicular to the axis of the idler pinion 38.

In the modification of Fig. 2, shaft 26$^a$ is extended and its end journaled in the bore 48 of shaft 32$^a$, and the gear 30$^a$ is fixed on a sleeve 50, which in its turn is fixed on shaft 32$^a$. While the parts may be pinned or otherwise secured together, it is ordinarily sufficient to rely for this purpose on merely fixing the parts together by a press or driving fit.

It will be seen that in producing a device as shown in Fig. 2 all the parts may be made to standard sizes, and by merely providing sleeves 50 of suitable length and equipped with gears 30$^a$ of suitable diameter and number of teeth to replace other geared sleeves, substantially any desired speed change ratio may be obtained which must, of course, be within a comparatively limited range. For example with the gears close together, as in Fig. 2 the change will be relatively small, whereas if sleeve 50 is shorter and gear 30$^a$ of less diameter and a smaller number of teeth, the change is larger, as will be plain from the showing of Fig. 1.

It is obvious that speed reduction or step up may be obtained at pleasure by merely reversing the relationship between driving and driven shafts. In either case the direction of rotation is unchanged.

The parts are kept lubricated by putting suitable lubricant in the chamber 14.

The provision of the single idler pinion 38 arranged at an angle to the principal shaft axis is an important feature of the present invention, producing great simplicity and convenience of assembly of the parts. The casing is preferably so arranged as to bring the idler pinion on the low side and in contact with the lubricant which accumulates on the low side but this is not essential.

Changes and modifications which may be resorted to are included within my invention when coming within the scope of my claims.

I claim:

1. A shaft, a spur gear on said shaft, a second shaft in axial alignment with said first named shaft, a spur gear on said second shaft of a different diameter from the first named gear, and in spaced relation from the first spur gear, and means for imparting rotation from one of said gears and its shaft to the other, said means comprising an elongated pinion having its teeth in engagement with the teeth of each of said spur gears at its opposite ends and being rotatable on an axis inclined to the common axis of said shafts.

2. A speed change apparatus comprising an elongated pinion having gear teeth alike throughout its length, and two separated spur gears having teeth of form and pitch adapted to mesh with the pinion teeth, on one and the same side of the pinion axis, one of said gears having a different number of teeth and a different diameter than the other, and the gear axes being inclined with respect to the axis of said pinion.

3. A speed change apparatus comprising a two part casing, aligned shafts extending through the casing parts respectively, a gear on each shaft within the casing, said gears having different diameters and number of teeth, an elongated pinion having trunnion bearings in the casing parts respectively and having teeth throughout its length like the teeth on said gears, said pinion being arranged on an axis inclined to the common shaft axis, said gears meshing with said pinion at separated regions in the length of said pinion.

4. A speed change apparatus comprising an elongated pinion, a driving and a driven shaft both having their axes inclined to the pinion axis, a gear on one shaft meshing with the pinion, and a gear of different diameter and number of teeth mounted on a sleeve which said sleeve is fixed to the remaining shaft, said last named gear likewise meshing with said pinion and both gears turning in the same rotational sense.

In testimony whereof, I have signed my name hereto.

JOSEPH BERGE.